United States Patent

Bruns

[11] Patent Number: 5,217,073
[45] Date of Patent: Jun. 8, 1993

[54] CUT-AND-CLOSE DEVICE FOR PRESSURE PIPES IN PRODUCTION AND SUPPLY INSTALLATIONS

[76] Inventor: Karsten Bruns, Anton-Guenther-Str. 23, W-2910 Westerstede, Fed. Rep. of Germany

[21] Appl. No.: 844,197

[22] Filed: Mar. 2, 1992

[30] Foreign Application Priority Data

May 7, 1991 [DE] Fed. Rep. of Germany ....... 4114887

[51] Int. Cl.$^5$ .............................................. E21B 29/00
[52] U.S. Cl. ....................................... 166/298; 166/55
[58] Field of Search ................... 166/297, 298, 55-55.8

[56] References Cited

U.S. PATENT DOCUMENTS

| 1,890,230 | 6/1931 | Bettinger. | |
|---|---|---|---|
| 3,598,154 | 8/1971 | Brundage. | |
| 3,692,107 | 9/1972 | Slator et al. | 166/298 X |
| 3,923,082 | 12/1975 | Blazek. | |
| 4,369,845 | 1/1983 | Henson et al. | 166/298 |
| 4,476,935 | 10/1984 | Hynes et al. | 166/55 X |

FOREIGN PATENT DOCUMENTS 3617522C 7/1987 Fed. Rep. of Germany.

Primary Examiner—Thuy M. Bui
Attorney, Agent, or Firm—Horst M. Kasper

[57] ABSTRACT

A cut-and-close device for pressure pipes in production and supply installations for gaseous and liquid media includes a two-piece clamping block. A pipe-cutting and pipe-closing plate is driven into said clamping block by means of a propelling charge and a piston, both of which form part of a drive unit. The clamping block (1) is divided in the middle of its circular opening into a rear part (1.1) and a front part (1.2). The rear part (1.1) and the front part (1.2) can be screwed together. The rear part (1.1) and the front part (1.2) have rectangular slits (3) on the inside. The front part (1.2) also possesses a slot opening (5) large enough for a shearing plate (6). The shearing plate (6) runs in guide grooves (16) of a connector (12) bolted to the front part (1.2) of the clamping block (1). The conductor (12) is attached to the drive unit consisting of a pressure cylinder (13), a piston (14), and a cartridge furnishing a remotely triggered propelling charge.

22 Claims, 1 Drawing Sheet

CUT-AND-CLOSE DEVICE FOR PRESSURE PIPES IN PRODUCTION AND SUPPLY INSTALLATIONS

FIELD OF THE INVENTION

The present invention relates to a device for extinguishing safely burning gas wells and burning oil wells with a sudden separation and closing of the production pipe in such a way that production can be resumed.

BRIEF DESCRIPTION OF THE BACKGROUND OF THE INVENTION INCLUDING PRIOR ART

The existing solutions, steps and measures for extinguishing oil and gas fires in production areas of oil and gas are largely limited to blasting techniques performed in the vicinity of the fire and flames. Alternatively an uncontrolled media flow is generated with the purpose of blowing out the fire and flames based on the pressure and presence of a gas, which does not support combustion. A further possibility comprises deforming the riser pipe to such an extent that the flow of oil or gas can be stopped or at least reduced. If a blast is used and the flames are put out by such a blast, then the oil or gas will continue to escape after the blast. An attempt to seal off the pipe efficiently presents a grave risk to those engaged in the work as the presence of burnable fluids or gases is always associated with a possibility of a fire or of an explosion and thus those engaged in the work are subjected to severe risks. As repair of a damaged production installation in general can be ruled out, there remains only a possibility of drilling a new bore hole.

SUMMARY OF THE INVENTION

It is an object of the present invention to provide a device suitable for extinguishing and capping a gas well or oil well with a high degree of security and safety during operation and a simple resumption of the oil and gas production.

It is a further object of the invention to furnish a system allowing resumption of operation of a gas or oil well after its destruction through fire or other causes.

It is a further object of the invention to provide a device which can be employed in cases of emergency and/or as a prophylactic measure at oil, gas or other installations involving transport of piped fluids.

These and other objects and advantages of the present invention will become evident from the description which follows:

BRIEF DESCRIPTION OF THE INVENTION

According to the present invention there is provided for a pipe-closing device for pressure pipes in production and supply installations for gaseous and liquid media. A front part of a clamping block has a semicircular inner periphery and a rectangular slit on the inside and possesses a slot opening for guiding the shearing plate. A rear part of a clamping block has a semicircular inner periphery and a rectangular slit on the inside. The front part and the rear part form the clamping block divided in the middle of its circular opening into the front part and the rear part. Means are provided for attaching the front part of the clamping block and the rear part of the clamping block to each other. A connector is attached to the front part and has guide grooves for guiding the shearing plate. A pressure cylinder is attached to the connector. A piston is guided by the pressure cylinder for engaging the shearing plate and for transmitting a force onto the shearing plate.

A cartridge can operate as a remotely triggered propelling charge for delivering force to the piston. The pressure cylinder, the piston, and the cartridge can form part of a drive unit. The shearing plate can provide a pipe-cutting and pip-closing plate driven by the propelling charge and by the piston into the clamping block.

The shearing plate can be guided in a radial direction. The means for attaching can provide for screwing the front part and the rear part together. The connector can be bolted to the front part. The shearing plate can run in the guide grooves of the connector.

Compensating holes for excessive gas can be disposed in the pressure cylinder or in the connector.

Shear pins can be shot into the pipe along with the shearing plate to prevent the clamping block from changing its position.

The shearing plate can be furnished with a plurality of cutting edges positioned at differing angles relative to the direction of impact of the shearing plate.

An invention method for closing pressure pipes in production and supply installations for gaseous and liquid media comprises the following steps. A front part of a clamping block, having a semicircular inner periphery and a rectangular slit on the inside and a slot opening for guiding a shearing plate, is attached to a rear part of a clamping block, having a semicircular inner periphery and a rectangular slit on the inside around a pipe to be closed. The front part and the rear part form the clamping block divided in the middle of its circular opening into the front part and the rear part. A connector is attached to the front part and a pressure cylinder is attached to the connector. A piston guided by the pressure cylinder is moved for engaging and for transmitting a force onto the shearing plate guided in guide grooves of the connector. The pipe is pierced and closed with the shearing plate.

A cartridge operating as a remotely triggered propelling charge can be triggered for delivering force to the piston. The pressure cylinder, the piston and the cartridge can form part of a drive unit. The shearing plate can provide a pipe-cutting and pipe closing plate driven by the propelling charge and the piston into the clamping block.

The shearing plate can be guided in a radial direction. The front part and the rear part of the clamping block can be screwed together. The connector can be bolted to the front part.

Excessive gas can be removed through compensating holes disposed in the pressure cylinder or in the connector.

Shear pins can be shot into the pipe along with the shearing plate to prevent the clamping block from changing its position. The pipe can be cut with a plurality of cutting edges of the shearing plate. The cutting edges can be positioned at differing angles relative to the direction of impact of the shearing plate.

The present invention provides a simple, safe, and in part reusable device which cuts off and permanently seals production pipes of wells. The application of this device does not involve any risks to a crew fighting a well fire and further allows resumption and continuation of production after the repair work has been completed.

The invention device is made up of three main components including a clamping block to be firmly mounted around the faulty pipe, a shearing plate provided by a steel plate furnished and fitted with one or several cutting edges, which shearing plate is guided and run in the clamping block along guide grooves, and a cylinder.

The drive unit comprises a cylinder, a piston and guide grooves. The drive unit is tightly connected to the clamping block during the period of operation and can be easily removed and reused after application of the drive unit at a scene of a well accident. The piston of the drive unit is driven by means of a propelling charge in the form of a cartridge. Alternatively, a hydraulic or any other type of propelling method can also be used.

The invention device is mounted such that the clamping block is firmly screwed to the pipe at a safe distance from the opening. The clamping block is fitted with a shearing plate held in guide grooves of the clamping block. The drive unit is attached to the side of the clamping block and secured by bolts. A cartridge is placed from the outside into the cylinder of the drive unit and sets off a propulsion of the cylinder upon ignition. The shearing plate faces with its cutting edges the defunct pipe to be closed off and the shearing plate is shot into the clamping block at great force. The shearing plate thereby cuts the pipe end of the damaged pipe off and pushes the end out. Several such invention systems should be attached to defunct well pipes as a preventive measure, since a failure of the operation of the invention device cannot be excluded. When applying a plurality of invention devices at a defunct pipe, then the invention device, disposed closest to the end of the pipe, should be triggered off first. The invention device is associated with the advantage that its use involves a limited risk. The clamping block and the shearing plate can be constructed such that the initial construction of the production installation can be restored by simple means after a separation and capping of a pipe end.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention.

DESCRIPTION OF INVENTION AND PREFERRED EMBODIMENT

Figures 1, 2:
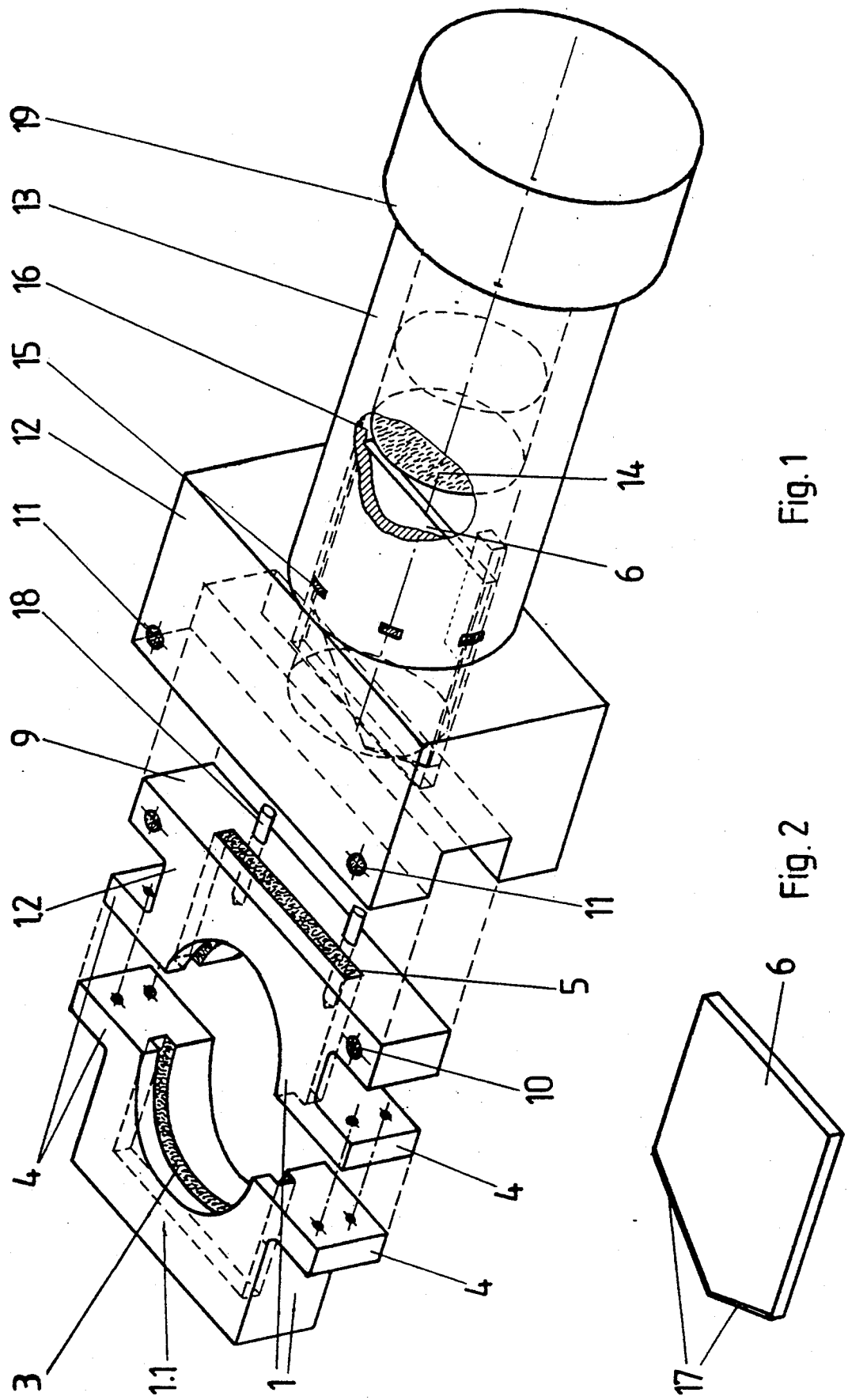
FIG. 1 is a perspective exploded view of the pipe closing device.
FIG. 2 is a perspective view of the shearing plate.

According to the present invention, there is provided for a cut-and-close device for pressure pipes in production and supply installations for gaseous and liquid media. The device includes a two-piece clamping block into which a pipe-cutting and pipe-closing plate is driven by means of a propelling charge and a piston, both of which form part of a drive unit. The clamping block 1 is divided in the middle of its circular opening into a rear part 1.1 and a front part 1.2, which two parts can be screwed together. The rear part 1.1 and the front part 1.2 have rectangular slits 3 on the inside, while the front part 1.2 also possesses a slot opening 5 large enough for a shearing plate 6 which runs in guide grooves 16 of a connector 12 bolted to the front part 1.2 of the clamping block 1. The the connector 12 is attached to the drive unit consisting of a pressure cylinder 13, a piston 14, and a cartridge furnishing a remotely triggered propelling charge.

Compensating holes 15 can be provided for excessive gas in the pressure cylinder 13 or in the connector 12.

Shear pins can be shot into a pipe along with the shearing plate 6 to prevent the clamping block 1 from changing its position.

The shearing plate 6 can include one or several cutting edges 17. Said cutting edges 17 can be positioned at various angles in the direction of impact.

In accordance with the invention, there is provided a two-piece clamping block consisting of a front part 1.1 and of a rear part 1.2. The clamping block resembles in its shape to a double-ended pipe clip. The semicircular front part and the semicircular rear part form together a full circle having a geometric surface corresponding and equivalent to the external diameter of the pipe, not illustrated, to be cut off and capped. An accurate positioning of the opposite slots 3 is achieved by tightening the front part 1.1 and the rear part 1.2 at their respective ends 4. The slots 3 are located in the upper third or quarter of the clamping block since the mounted clamping block 1 is resistant to pressure. The size of the slot opening 5 conforms exactly to the measurements and dimensions of the shearing plate. There are numerous possibilities and measures enabling a subsequent pipe repair, which may become necessary to restore well production. There are numerous possibilities and measures enabling an accurate and lasting closure of the pipe opening.

The drive unit comprises a connector 12, a pressure cylinder 13, a piston 14, and a cylinder tail piece 19, providing room for the cartridge along with the ignition system, for a hydraulic connection or any other propellant appropriate to thrust the piston forward.

Following the attachment of the clamping block to the predetermined disconnection point on the pressure pipe, the connector 12 is slid onto the support of the front part 1. 2, thereby connecting the clamping block firmly with the drive unit by placing two safety bolts into the overlapping installation holes 10 and 11. The movable shearing plate 6, with its cutting edges 17 directed to the pipe, is held in axial direction to the cylinder 13 in the guide grooves 16 of the connector 12 and enters the slot 5 of the front piece 1.2 up to the pipe. With the ignition of the propellant in the tail piece of the cylinder at a safe distance, the shearing plate 6 is thrust forward in an explosion-like movement and, due to the accelerating speed of the piston and having sheared off the pipe, the shearing plate 6 reaches its final position in the clamping block. Based on the slanted edge of the shearing plate 6, the pipe end, which is to be removed, is deformed and catapulted out of the clamping block owing to the wedge effect of the shearing plate. An excess propelling charge is utilized to bring the shearing plate 6 into its final position, whereby the shearing plate 6 tightly seals off the opening of the pipe in order to ensure that the device fulfils its task flawlessly. Excessive gas escapes through compensating holes 15 in the pressure cylinder 13 shortly before the shearing plate reaches its final position. At least one shear pin 18 can be shot into the pipe wall along with the propelling shearing plate 6 in order to obtain a prestressed press fit of the shearing plate 6 onto the edge of the pipe and in order to prevent a change in the position of the clamping block for reasons of safety.

The mass of the piston 14 preferably equals the mass of the shearing plate 6 in order to allow an elastic transfer of the kinetic energy and momentum from the piston 14 to the shearing plate 6. The piston 14 and the shearing plate 6 can each be provided with an elastic spherical sector opposing each other for transferring the kinetic energy and momentum elastically from the piston 14 to the shearing plate 6.

It will be understood that each of the elements described above, or two or more together, may also find a useful application in other types of cut-and-closing devices differing from the types described above.

While the invention has been illustrated and described as embodied in the context of a cut-and-close device for pressure pipes in production and supply installations, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the general or specific aspects of this invention.

What is claimed as new and desired to be protected by Letters Patent is set forth in the appended claims:

1. A cut-and-close device for pressure pipes in production and supply installations for gaseous and liquid media comprising
    a shearing plate;
    a front part of a clamping block having a semicircular inner periphery and having a rectangular slit on the inside and possessing a slot opening large enough for the shearing plate;
    a rear part of the clamping block having a semicircular inner periphery and having a rectangular slit on the inside, wherein the front part and the rear part form the clamping block divided in the middle of its circular opening into the front part and the rear part, wherein the front part and the rear part form two halves;
    means for screwing the front part of the clamping block and the rear part of the clamping block together;
    a connector bolted to the front part and having guide grooves, wherein the shearing plate runs in the guide grooves of the connector;
    a pressure cylinder, wherein the connector is attached to the pressure cylinder;
    a piston;
    a cartridge operating as a remotely triggered propelling charge, wherein the pressure cylinder, the piston and the cartridge form part of a drive unit and wherein the shearing plate provides a pipe-cutting and pipe-closing plate driven by the propelling charge and the piston into the clamping block.

2. The cut-and-close device according to claim 1, further comprising
    compensating holes for excessive gas disposed in the pressure cylinder.

3. The cut-and-close device according to claim 1, further comprising
    compensating holes for excessive gas disposed in the connector.

4. The cut-and-close device according to claim 1, further comprising
    shear pins shot into the pipe along with the shearing plate to prevent the clamping block from changing its position.

5. The cut-and-close device according to claim 1, wherein the shearing plate is furnished with a plurality of cutting edges positioned at differing angles relative to the direction of impact of the shearing plate.

6. A pipe-closing device for pressure pipes in production and supply installations for gaseous and liquid media comprising
    a shearing plate;
    a front part of a clamping block having a semicircular inner periphery and having a rectangular slit on the inside and possessing a slot opening for guiding the shearing plate;
    a rear part of a clamping block having a semicircular inner periphery and having a rectangular slit on the inside, wherein the front part and the rear part form the clamping block divided in the middle of its circular opening into the front part and the rear part;
    means for attaching the front part of the clamping block and the rear part of the clamping block to each other;
    a connector attached to the front part and having guide grooves for guiding the shearing plate;
    a pressure cylinder attached to the connector;
    a piston guided by the pressure cylinder for engaging the shearing plate and for transmitting a force onto the shearing plate.

7. The pipe-closing device according to claim 6 further comprising
    a cartridge operating as a remotely triggered propelling charge for delivering force to the piston, wherein the pressure cylinder, the piston, and the cartridge form part of a drive unit, and wherein the shearing plate provides a pipe-cutting and pipe-closing plate driven by the propelling charge and by the piston into the clamping block.

8. The pipe-closing device according to claim 6
    wherein the shearing plate is guided in a radial direction;
    wherein the means for attaching provides for screwing the front part and the rear part together;
    wherein the connector is bolted to the front part;
    wherein the shearing plate runs in the guide grooves of the connector.

9. The pipe closing device according to claim 6 further comprising
    compensating holes for excessive gas disposed in the pressure cylinder.

10. The pipe closing device according to claim 6 further comprising
    compensating holes for excessive gas disposed in the connector.

11. The pipe closing device according to claim 6 further comprising
    shear pins shot into the pipe along with the shearing plate to prevent the clamping block from changing its position.

12. The pipe closing device according to claim 6, wherein the shearing plate is furnished with a plurality of cutting edges positioned at differing angles relative to the direction of impact of the shearing plate.

13. Cut-and-close device for pressure pipes in production and supply installations for gaseous and liquid media, wherein the device includes a two-piece clamping block into which a pipe-cutting and pipe-closing plate is driven by means of a propelling charge and a piston, both of which form part of a drive unit;

wherein the clamping block (1) is divided in the middle of its circular opening into a rear part (1.1) and a front part (1.2), which two parts can be screwed together;

wherein the rear part (1.1) and the front part (1.2) have rectangular slits (3) on the inside, while the front part (1.2) also possesses a slot opening (5) large enough for a shearing plate (6) which runs in guide grooves (16) of a connector (12) bolted to the front part (1.2) of the clamping block (1);

wherein the connector (12) is attached to the drive unit consisting of a pressure cylinder (13), a piston (14), and a cartridge furnishing a remotely triggered propelling charge.

14. The cut-and-close device according to claim 13, characterized by compensating holes (15) for excessive gas in the pressure cylinder (13) or in the connector (12).

15. The cut-and-close device according to claim 13, characterized by shear pins shot into a pipe along with the shearing plate (6) to prevent the clamping block (1) from changing its position.

16. The cut-and-close device according to claim 13, characterized in that the shearing plate (6) includes one or several cutting edges (17), which cutting edges (17) are positioned at various angles in the direction of impact.

17. A method for closing pressure pipes in production and supply installations for gaseous and liquid media comprising attaching a front part of a clamping block having a semicircular inner periphery and having a rectangular slit on the inside and possessing a slot opening for guiding a shearing plate to a rear part of a clamping block having a semicircular inner periphery and having a rectangular slit on the inside around a pipe to be closed, wherein the front part and the rear part form the clamping block divided in the middle of its circular opening into the front part and the rear part;

attaching a connector to the front part;

attaching a pressure cylinder to the connector;

moving a piston guided by the pressure cylinder for engaging and for transmitting a force onto the shearing plate guided in guide grooves of the connector;

piercing and closing the pipe with the shearing plate.

18. The method for closing pressure pipes according to claim 17 further comprising triggering a cartridge operating as a remotely triggered propelling charge for delivering force to the piston, wherein the pressure cylinder, the piston and the cartridge form part of a drive unit, and wherein the shearing plate provides a pipe-cutting and pipe closing plate driven by the propelling charge and the piston into the clamping block.

19. The method for closing pressure pipes according to claim 17 further comprising guiding the shearing plate in a radial direction;

screwing the front part and the rear part of the clamping block together;

bolting the connector to the front part.

20. The method for closing pressure pipes according to claim 17 further comprising removing excessive gas through compensating holes disposed in the pressure cylinder.

21. The method for closing pressure pipes according to claim 17 further comprising removing excessive gas through compensating holes disposed in the connector.

22. The method for closing pressure pipes according to claim 17 further comprising shooting shear pins into the pipe along with the shearing plate to prevent the clamping block from changing its position;

cutting the pipe with a plurality of cutting edges of the shearing plate, wherein the cutting edges are positioned at differing angles relative to the direction of impact of the shearing plate.

* * * * *